(12) United States Patent
Chen

(10) Patent No.: US 9,862,227 B2
(45) Date of Patent: Jan. 9, 2018

(54) METHOD FOR DETECTING THE WHEEL CENTER DEPTH OF AN ALUMINUM WHEEL CAST BLANK

(71) Applicant: CITIC Dicastal CO., LTD, Qinhuangdao (CN)

(72) Inventor: Zhi Chen, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 0 days.

(21) Appl. No.: 15/413,952

(22) Filed: Jan. 24, 2017

(65) Prior Publication Data
US 2017/0211928 A1    Jul. 27, 2017

(30) Foreign Application Priority Data
Jan. 26, 2016   (CN) .......................... 2016 1 0050866

(51) Int. Cl.
*B60B 3/00*   (2006.01)
*G01B 11/02*   (2006.01)
*B60B 3/10*   (2006.01)

(52) U.S. Cl.
CPC ............... *B60B 3/10* (2013.01); *G01B 11/02* (2013.01)

(58) Field of Classification Search
None
See application file for complete search history.

(56) References Cited

U.S. PATENT DOCUMENTS

| 3,155,383 | A  | * | 11/1964 | Whitmore | B23Q 1/38 108/143 |
| 4,729,536 | A  | * | 3/1988 | Scala | B23Q 1/621 108/143 |
| 5,098,272 | A  | * | 3/1992 | Joseph | B29C 45/14 249/56 |
| 6,486,963 | B1 | * | 11/2002 | Holec | G01B 11/24 356/601 |
| 6,501,554 | B1 | * | 12/2002 | Hackney | G01B 11/00 356/601 |
| 8,776,372 | B2 | * | 7/2014 | Krajewski | B60B 3/06 29/894 |
| 9,420,235 | B2 | * | 8/2016 | Wen | H04N 7/18 |
| 9,488,469 | B1 | * | 11/2016 | Michael | G01B 11/25 |
| 9,691,642 | B2 | * | 6/2017 | Iwahashi | B61H 5/00 |
| 2016/0102554 | A1 | * | 4/2016 | Cornell | F01C 5/005 416/223 A |

* cited by examiner

*Primary Examiner* — Shawn Decenzo
*Assistant Examiner* — Jarreas C Underwood
(74) *Attorney, Agent, or Firm* — Maier & Maier, PLLC

(57) ABSTRACT

The invention relates to a device and method for detecting the wheel center depth of an aluminum wheel cast blank, the device includes a roller way tray, a position sensor, a frame, a CCD camera, a programmable controller and a laser distance measurement sensor, an upper servo-cylinder, a motor support, a servo-motor and a lower servo-cylinder. The invention has the following advantages: the method for automatically detecting and identifying the wheel center depth of an aluminum wheel cast blank is utilized for the identification and classification of wheel cast blanks, so as to reduce the influence of large casting dimension tolerance on the machining dimension tolerance, increase the acceptability rate of products from the automatic machining unit, ensure that the production line automatically runs with high quality and quantity and also reduce the labor intensity of operators.

2 Claims, 2 Drawing Sheets

METHOD FOR DETECTING THE WHEEL CENTER DEPTH OF AN ALUMINUM WHEEL CAST BLANK

TECHNICAL FIELD

The invention relates to the field of industrial detection and in particular to a device and method for detecting the wheel center depth of an aluminum wheel cast blank.

BACKGROUND ART

With the increase of manpower cost, there is an urgent need for automatic production in low-pressure cast aluminum wheel industry, the production flow of low-pressure cast wheels is as follows: smelting →low-pressure casting-→moving to runner→heat treatment→machining→coating-→packaging and delivery. As the casting tolerance of cast wheel blanks is generally ±0 .9 mm, and is random to a certain extent, while the dimension of cap groove of wheel products depends on the cast surface in combination with the machined surface, and the tolerance has strict requirement, and is generally ±0 .25 mm, if the cast wheel blank from heat treatment is directly delivered using the stream roller way to the automatic machining unit for machining, the dimension of the cast blank within the tolerance range is random, as a result, the cap groove dimension that depends on the combination of the cast surface and the machined surface is extremely poor, causing low acceptability rate of wheel machined products and the increase of manufacturing cost.

SUMMARY OF THE INVENTION

As used herein, 'wheel center depth' refers to the Y-axial distance from the machining position reference plane (9) to the wheel center measurement point (10), the wheel center measurement point (10) is a point on the bottom plane of the bolt hole counter bore of the wheel cast blank, and this point represents the position of wheel center.

The problem to be solved by the invention is to provide a method for automatically detecting and identifying the wheel center depth of a low-pressure cast aluminum wheel blank, which can, before the wheel cast blank enters the automatic machining unit, detect and identify the depth from the machining position reference plane to the wheel center, and classify the wheel cast blank in a near-to-upper limit group or a near-to-lower limit group based on the depth value, convey to different automatic machining units and adjust the machining programs of the automatic machining units to correspond to the two different modes of wheel cast blanks respectively, so as to increase the acceptability rate of wheel machined products.

In order to achieve the above purpose of the invention, the invention provides the following technical solution:

In one aspect of the invention, a device for detecting the wheel center depth of a wheel cast blank is provided, which is characterized in that: the device comprises a roller way tray (1), a position sensor (3), a frame (4), a CCD camera (5), a programmable controller (6) and a laser distance measurement sensor (7), an upper servo-cylinder (8), a motor support (11), a servo-motor (12) and a lower servo-cylinder (13), wherein: the frame (4) is suspended above the roller way tray (1) with a space being defined between the frame (4) and the roller way tray (1) for holding the aluminum wheel cast blank to be detected; the upper servo-cylinder (8) is mounted on the frame and can drive the laser distance measurement sensor to move horizontally, the motor support (11) is mounted below the roller way tray (1), the servo-motor (12) is mounted to the motor support (11) to drive the roller way tray (1) to rotate, the lower servo-cylinder (13) is connected onto the motor support (11) to drive the roller way tray to move up and down, the CCD camera (5) and the programmable controller (6) are mounted on the frame (4), and the laser distance measurement sensor (7) is mounted on the upper servo-cylinder.

In another aspect of the invention, a method for detecting the wheel center depth of an aluminum wheel blank using the device described hereinbefore is provided, which is characterized in that: the method comprises the following steps: conveying the wheel cast blank (2) onto the roller way tray (1), actuating the CCD camera (5) that is mounted on the frame (4) to collect an image of the wheel cast blank (2), outputting to the programmable controller (6), and performing image recognition on the obtained image by the programmable controller (6), identifying the position of one bolt hole counter bore on the wheel cast blank that is closest to the X axis, and taking any point on the bottom plane of the bolt hole counter bore as a wheel center measurement point (10), and calculating the included angle between the wheel center measurement point (10) and the X axis, and calculating the angle difference, and outputting a signal to the servo-motor (12) to drive the roller way tray (1) to rotate, making the wheel center measurement point (10) on the wheel cast blank (2) superposed on the X axis, and transmitting the X-axial position of the wheel center measurement point (10) after superposition to the programmable controller (6), enabling the programmable controller (6) to calculate the X-axial position of the wheel center measurement point (10) and the position where the laser sensor (10) is located, and outputting a signal to the upper servo-cylinder (8) to drive the laser distance measurement sensor (7) to move in the axial direction until reaching the position over the wheel center measurement point (10), then enabling the programmable controller (6) to send a command to the lower servo-cylinder (13), to drive the roller way tray (1) to lift up, enabling a machining position reference plane (9) of the wheel cast blank (2) in contact with the position sensor (3) that is mounted on the frame (4), enabling the position sensor (3) to transmit a position signal to the programmable controller (6), also actuating the distance measurement function of the laser distance measurement sensor (7) to measure the distance to the wheel center measurement point (10), and transmitting the data to the programmable controller (6), enabling the programmable controller (6), based on the data fed back from the position sensor (3) and the laser distance measurement sensor (7), to calculate the difference, to obtain the wheel center depth.

In one aspect of the invention, a method for machining a low-pressure cast aluminum wheel blank is provided, which is characterized in that: the method comprises measuring the wheel center depth using the method described hereinbefore, and enabling the programmable controller (6) to calculate a difference based on the input theoretical dimension, determine which range of tolerance the wheel center depth of the wheel cast blank (2) lies in based on the difference, and determine whether the wheel center depth is near to the upper limit of tolerance or the lower limit of tolerance, then enabling the programmable controller (6) to send a signal to the roller way tray (1), conveying the wheel cast blank (2) to a predefined automatic machining unit, to implement the identification and classification of the wheel cast blank (2).

In other aspects of the invention, the following technical solution is also provided:

The solution employed in the invention also comprises: the identification of wheel center position is performed using the CCD camera, the position of a distance measurement point is determined, the laser distance measurement sensor measures, based on the data from the CCD camera, to obtain the data of depth from the positioning reference plane to the wheel center, the programmable controller performs comparative analysis of design dimension data and measured dimension data of wheel center depth of wheel types, to determine the dimension range to which the wheel cast blank belongs based on the difference, and determine automatic machining units, the wheel cast blank is conveyed to the corresponding automatic machining unit by an execution mechanism, so as to achieve the effect of classifying the wheel cast blanks based on the wheel center depth and assigning to different automatic machining units.

The invention has the following advantages: the method for automatically detecting and identifying the wheel center depth of a wheel cast blank is utilized to accurately detect and identify the depth dimension from the wheel cast blank to the wheel center and classify the wheels based on the wheel center depth dimensions and assign to different automatic machining units, so as to reduce the influence of large casting dimension tolerance on the machining dimension tolerance, increase the acceptability rate of products from the automatic machining units and also reduce the labor intensity of operators.

The invention has the benefits as follows: the method for automatically detecting and identifying the wheel center depth of an aluminum wheel cast blank is utilized for the identification and classification of wheel cast blanks, so as to reduce the influence of large casting dimension tolerance on the machining dimension tolerance, increase the acceptability rate of products from the automatic machining unit, ensure that the production line automatically runs with high quality and quantity and also reduce the labor intensity of operators.

BRIEF DESCRIPTION OF THE DRAWINGS

The embodiments of the invention will be described below in details with reference to the accompanying drawings, wherein.

In the figures, 1-roller way tray; 2-wheel cast blank; 3-position sensor; 4-frame; 5-CCD camera; 6-programmable controller; 7-laser distance measurement sensor; 8-upper servo-cylinder; 9-wheel machining positioning reference plane; 10-wheel center measurement point; 11-motor support; 12-servo-motor; 13-lower servo-cylinder.

DETAILED DESCRIPTION OF THE INVENTION

Example 1

Figure 1:
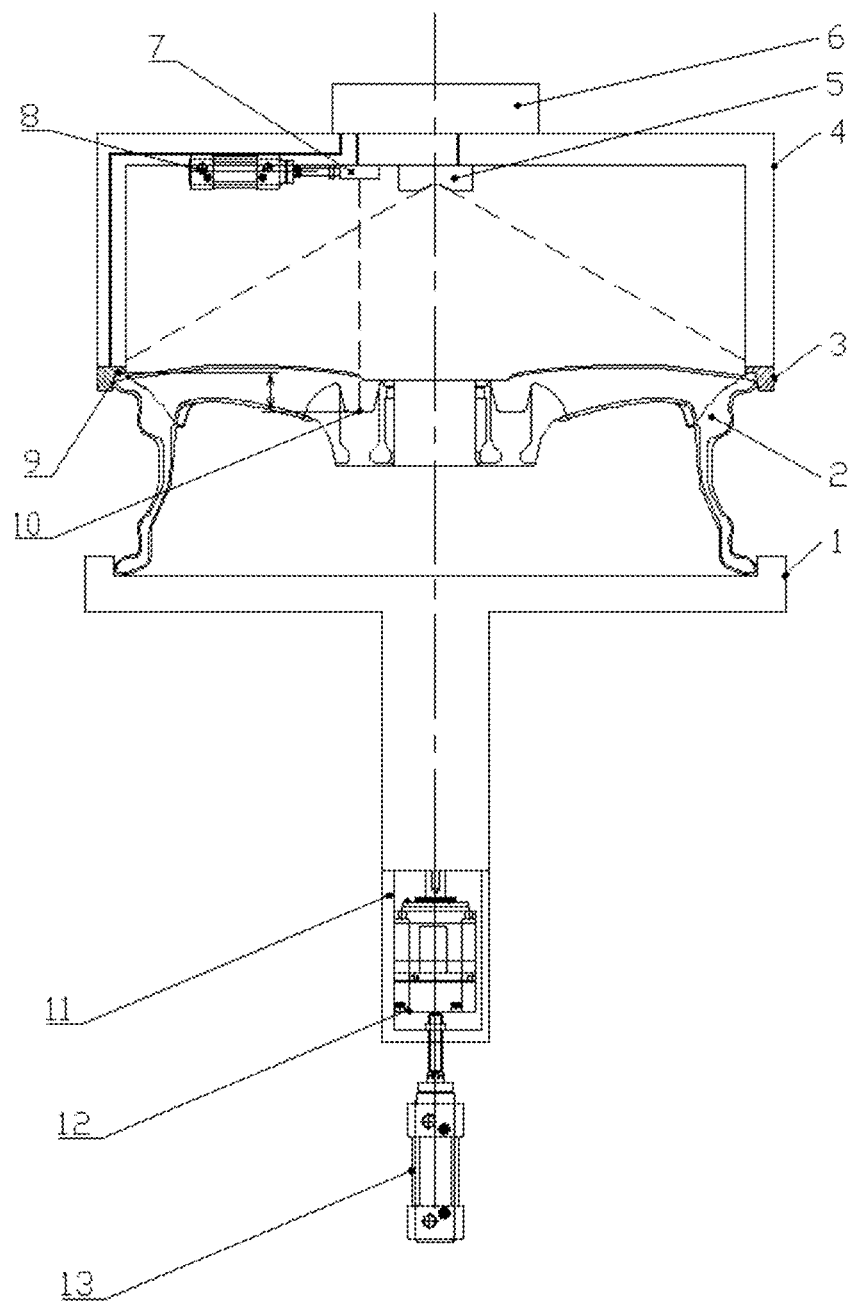
FIG. 1 is a schematic view of the principle of a method for automatically detecting and identifying the wheel center depth of a wheel cast blank.
Figure 2:
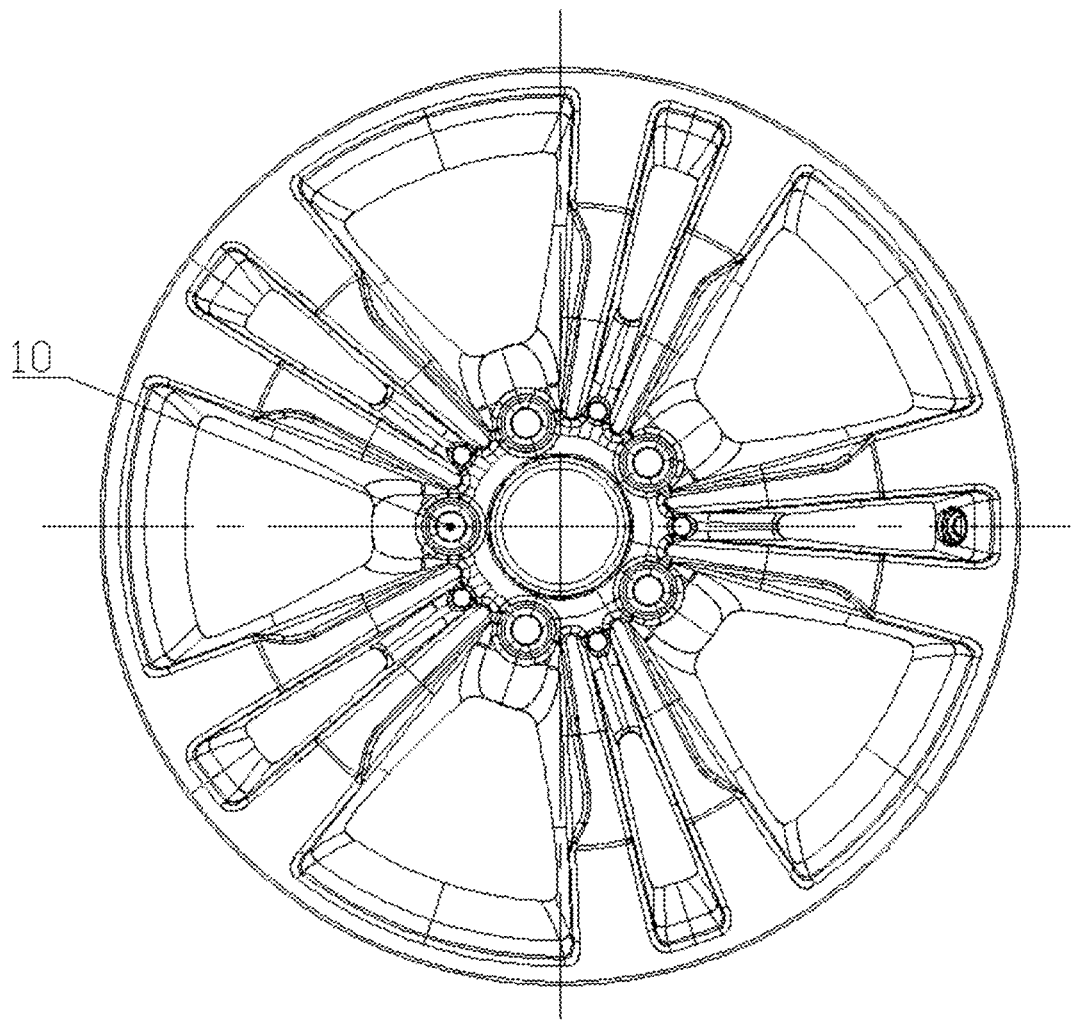
FIG. 2 is a schematic view of the position of a wheel center measurement point.

As shown in FIG. 1, the wheel cast blank (2) is conveyed onto the roller way tray (1), the CCD camera (5) that is mounted on the frame (4) is actuated, to collect an image of the wheel cast blank (2), the image is output to the programmable controller (6) which performs image recognition on the obtained image, to identify the position of one bolt hole counter bore on the wheel cast blank that is closest to the X axis, and any point on the bottom plane of the bolt hole counter bore is taken as a wheel center measurement point (10), and the included angle between the wheel center measurement point (10) and the X axis is calculated, the angle difference is calculated, a signal is output to the servo-motor (12) to drive the roller way tray (1) to rotate, the wheel center measurement point (10) on the wheel cast blank (2) is superposed on the X axis, and the X-axial position of the wheel center measurement point (10) after superposition is transmitted to the programmable controller (6), the programmable controller (6) calculates the X-axial position of the wheel center measurement point (10) and the position where the laser sensor (10) is located, and outputs a signal to the upper servo-cylinder (8) to drive the laser distance measurement sensor (7) to move in the axial direction until reaching the position over the wheel center measurement point (10), then the programmable controller (6) sends a command to the lower servo-cylinder (13), to drive the roller way tray (1) to lift up, the machining position reference plane (9) of the wheel cast blank (2) is allowed in contact with the position sensor (3) that is mounted on the frame (4), the position sensor (3) transmits a position signal to the programmable controller (6), also the distance measurement function of the laser distance measurement sensor (7) is actuated to measure the distance to the wheel center measurement point (10), and the data is transmitted to the programmable controller (6), the programmable controller (6), based on the data fed back from the position sensor (3) and the laser distance measurement sensor (7), calculates the difference, to obtain the wheel center depth. That is, the Y-axial distance from the machining position reference plane (9) to the wheel center measurement point (10), the programmable controller (6) to determine which range of tolerance the wheel center depth of the wheel cast blank (2) lies in based on the comparison to the input theoretical dimension, then the programmable controller (6) sends a signal to the roller way tray (1), the wheel cast blank (2) is conveyed to a predefined automatic machining unit, so as to implement the identification and classification of the wheel cast blank (2), reduce the influence of casting dimension tolerance on the machining dimension tolerance, increase the acceptability rate of products from the automatic machining unit, and ensure that the production line automatically runs with high quality and quantity.

The invention claimed is:
1. A method for detecting the wheel center depth of an aluminum wheel cast blank comprising:
  conveying a wheel cast blank onto a roller way tray, actuating a CCD camera mounted on a frame to collect an image of the wheel cast blank, outputting to a programmable controller, and performing image recognition on the obtained image by the programmable controller, identifying a position of one bolt hole counter bore on the wheel cast blank that is closest to the X axis, and taking any point on a bottom plane of the bolt hole counter bore as a wheel center measurement point, and calculating an included angle between the wheel center measurement point and the X axis, and calculating the angle difference, and outputting a signal to a servo-motor to drive the roller way tray to rotate, making the wheel center measurement point on the wheel cast blank superposed on the X axis, and transmitting the X-axial position of the wheel center measurement point after superposition to the programmable controller, enabling the programmable controller to calculate the X-axial position of the wheel center measurement point and the position where the laser sensor is located and outputting a signal to an upper servo-cylinder to drive a laser distance measurement sensor to move in the axial direction until reaching the position directly over the wheel center measurement point, then enabling the programmable controller to send a command to a lower servo-cylinder, to drive the roller way tray to lift up, enabling a machining position reference plane of the wheel cast blank in contact with the position sensor that is mounted on the frame, enabling a position sensor to transmit a position signal to the programmable controller, also actuating a distance measurement function of the laser distance measurement sensor to measure the distance to the wheel center measurement point, and transmitting the data to the programmable controller, enabling the programmable controller, based on the data fed back from the position sensor and the laser distance measurement sensor, to calculate the difference, to obtain the wheel center depth.

2. A method for machining a low pressure cast aluminum wheel blank, the method comprising measuring the wheel center depth using the method of claim 1, enabling the programmable controller to determine which range of tolerance the wheel center depth of the wheel cast blank lies in based on the comparison to the input theoretical dimension, then enabling the programmable controller to send a signal to the roller way tray, conveying the wheel cast blank to a predefined automatic machining unit to implement the identification and classification of the wheel cast blank.

* * * * *